UNITED STATES PATENT OFFICE.

EDWARD D. MARTINET, OF LOS ANGELES, CALIFORNIA.

COMPOSITION FOR WALL-BOARD.

1,371,505.   Specification of Letters Patent.   Patented Mar. 15, 1921.

No Drawing.   Application filed March 25, 1920.  Serial No. 368,698.

*To all whom it may concern:*

Be it known that I, EDWARD D. MARTINET, a citizen of the United States, and a resident of Los Angeles, in the county of Los Angeles and State of California, have invented certain new and useful Improvements in Compositions for Wall-Board, of which the following is a specification.

My invention is an improvement in compositions, and has for its object to provide a composition especially adapted for use in the preparation of composition board, wherein the composition is simple, inexpensive, easily prepared and lasting in use.

In the present embodiment of the invention the improved composition is composed of ordinary building plaster, saw dust, extract of cactus juice and heavy black molasses, the proportion of the ingredients and the manner of preparing the same being hereinafter described.

The composition, after being prepared, is pressed, molded or otherwise formed into boards of suitable size, and these boards are preferably reinforced in the manner set forth in my co-pending application Serial No. 241,580, now patent No. 1,333,553, March 9, 1820 of which the present application is a continuation in part.

In preparing the improved composition the ingredients are mixed in the proportion of four pounds of cactus juice to one-quarter gallon of black molasses, thickened with plaster and saw dust to a degree where it can be worked. The cactus juice and the black molasses in the proportions of four pounds of one to one-quarter gallon of the other are mixed together and afterward thickened with the plaster and saw dust.

The improved composition forms a board which is sufficiently rigid, yet flexible and elastic, and which will permit a nail to be driven through the same and will hold the nail so that it does not pull out easily.

The purpose of the cactus juice is to set slowly, and also to act as an adhesive between the paper and the remaining elements of the composition. The cactus juice is in the nature of an anti-drier and has some adhesive properties.

I claim:

1. A composition composed of plaster, saw dust, cactus juice and black molasses.

2. A composition composed of extract of cactus juice four pounds, black molasses one-fourth gallon, thickened with plaster and saw-dust to a degree where it can be easily worked.

EDWARD DROCTORE MARTINET.